US010421352B2

(12) United States Patent
Urbach

(10) Patent No.: US 10,421,352 B2
(45) Date of Patent: Sep. 24, 2019

(54) AIR FLAP APPARATUS HAVING A SHIFTING DRUM HAVING CONTROL GROOVES ON THE ENVELOPING SURFACE

(71) Applicant: Röchling Automotive SE & Co. KG, Mannheim (DE)

(72) Inventor: Patrick Urbach, Mainz (DE)

(73) Assignee: Röchling Automotive SE & Co. KG, Mannheim (DE)

(*) Notice: Subject to any disclaimer, the term of this patent is extended or adjusted under 35 U.S.C. 154(b) by 0 days.

(21) Appl. No.: 16/216,444

(22) Filed: Dec. 11, 2018

(65) Prior Publication Data

US 2019/0176612 A1 Jun. 13, 2019

(30) Foreign Application Priority Data

Dec. 13, 2017 (DE) .................. 10 2017 222 678

(51) Int. Cl.
*B60K 11/00* (2006.01)
*B60K 11/08* (2006.01)

(52) U.S. Cl.
CPC ........ *B60K 11/085* (2013.01); *B60K 2700/00* (2013.01)

(58) Field of Classification Search
CPC .... B60K 11/085; B60K 11/08; B60K 2700/00
See application file for complete search history.

(56) References Cited

U.S. PATENT DOCUMENTS 5,470,276 A * 11/1995 Burnell .................. B60H 1/345
454/155
6,131,336 A 10/2000 Krause et al.
(Continued)

FOREIGN PATENT DOCUMENTS

DE 19928834 A1 12/2000
DE 10022414 A1 4/2001
(Continued)

OTHER PUBLICATIONS

German Search Report for corresponding DE 10 2017 222 678.1 dated Oct. 31, 2018, 7 pgs.
(Continued)

*Primary Examiner* — James M Dolak
(74) *Attorney, Agent, or Firm* — Rankin, Hill & Clark LLP

(57) ABSTRACT

An air flap apparatus for a motor vehicle having a driving force source to drive a plurality of air flaps between their operating positions; the apparatus having at least two sub-groups of air flap(s) which are displaceable separately from one another between their operating positions but are drivable by the shared driving force source; there being arranged between the driving force source and the at least two sub-groups a gated control configuration which in order to transfer driving force to different sub-groups has, on a groove carrier rotatable around a rotation axis, at least two control grooves embodied separately and arranged at a distance from one another, into each of which a control pin penetrates, each combination of control pin and control groove being motion-transferringly coupled to a different sub-group, the at least two control grooves are embodied on an enveloping surface of the groove carrier at an axial distance from one another and are coded such that for two sub-groups, they permit at least four different combinations of operating positions.

9 Claims, 2 Drawing Sheets

(56) References Cited

U.S. PATENT DOCUMENTS

| | | | |
|---|---|---|---|
| 6,796,895 B2* | 9/2004 | Demerath | B60H 1/3421 454/155 |
| 6,997,240 B2* | 2/2006 | Denk | B60H 1/00678 165/42 |
| 8,544,581 B2 | 10/2013 | Stokes et al. | |
| 8,550,887 B2* | 10/2013 | Walters | B60K 11/085 454/155 |
| 9,168,827 B2* | 10/2015 | Povinelli | B60K 11/085 |
| 9,272,614 B1* | 3/2016 | Povinelli | B60K 11/085 |
| 10,024,560 B2* | 7/2018 | Schneider | F24F 13/1426 |
| 10,160,309 B2* | 12/2018 | Schwarz | B60K 11/085 |
| 10,166,858 B2* | 1/2019 | Ibanez Moreira | B60K 11/085 |
| 10,272,768 B2* | 4/2019 | Huijzers | B60K 11/085 |
| 10,293,681 B2* | 5/2019 | Vacca | B60K 11/085 |
| 2016/0288614 A1* | 10/2016 | Wild | F16H 25/18 |

FOREIGN PATENT DOCUMENTS

| | | |
|---|---|---|
| DE | 102013221336 A1 | 4/2015 |
| DE | 102015201534 B3 | 4/2016 |
| DE | 102016219057 A1 | 4/2018 |

OTHER PUBLICATIONS

Espacenet Bibliographic data:DE 102015201534 (B3), Published Apr. 21, 2016, 2 pgs.

Espacenet Bibliographic data:DE 10022414 (A1), Published Apr. 12, 2001, 1 pg.

Espacenet Bibliographic data:DE 19928834(A1), Published Dec. 28, 2000, 1 pg.

Espacenet Bibliographic data:DE 102013221336(A1), Published Apr. 23, 2015, 1 pg.

Espacenet Bibliographic data:DE 102016219057(A1), Published Apr. 5, 2018, 1 pg.

* cited by examiner

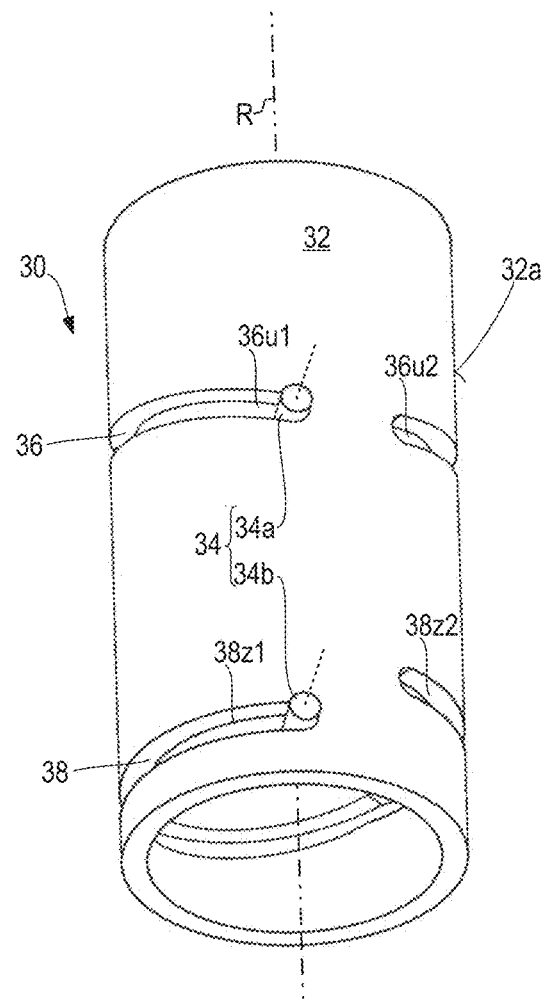
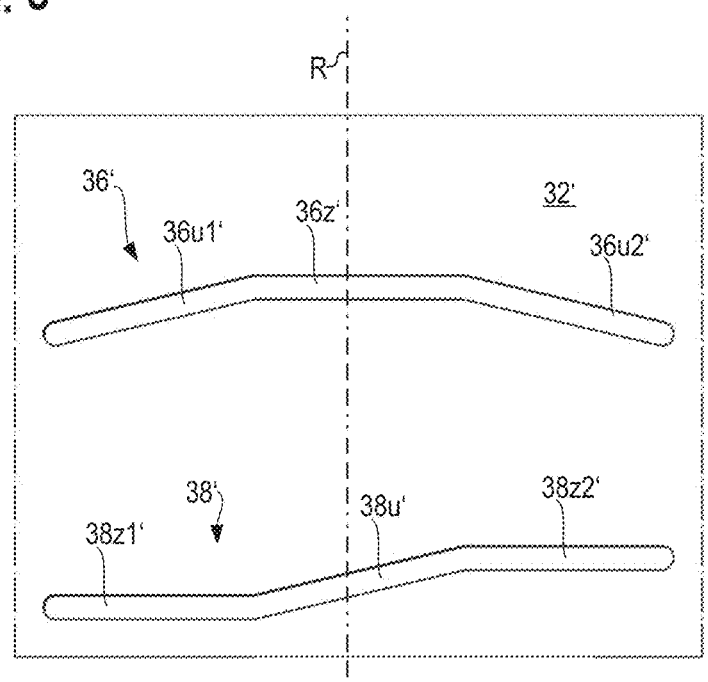

AIR FLAP APPARATUS HAVING A SHIFTING DRUM HAVING CONTROL GROOVES ON THE ENVELOPING SURFACE

The present invention relates to an air flap apparatus for a motor vehicle, the air flap apparatus comprising at least one frame having an air passthrough opening embodied therein and a plurality of air flaps that are mounted movably on the frame and at least project into the air passthrough opening or span it; the air flaps being movable between two operating positions, an open position and a closed position; the air flaps covering a smaller proportion of the air passthrough opening in the open position than in the closed position, when the air passthrough opening is viewed in a direction orthogonal to it. The air flap apparatus comprises a driving force source by way of whose driving force the plurality of air flaps are drivable to move between their operating positions. The air flap apparatus comprises at least two sub-groups each having at least one air flap, which are displaceable separately from one another between their operating positions but are drivable by the shared driving force source. Arranged between the driving force source and the at least two sub-groups is a gated control configuration, constituting a driving force distributor apparatus, which in order to transfer driving force to different sub-groups comprises, on a groove carrier rotatable around a rotation axis, two control grooves, embodied separately and arranged at a distance from one another, into each of which a control pin penetrates, each combination of control pin and control groove being motion-transferringly coupled to a different one of the sub-groups.

BACKGROUND OF THE INVENTION

An air flap apparatus of this kind is known from WO 2012/161783 A2. It allows different sub-groups, each having several air flaps, to be driven by a shared driving force source for a displacement motion. The aforesaid gated control configuration is provided in order to achieve, from the driving force that is always furnished or not furnished by the single driving force source for all the sub-groups simultaneously, a displacement of the subgroups into different operating states in which the respective air flaps of one sub-group are in the same operating position but the air flaps of different sub-groups can be in different or the same operating positions.

The groove carrier of this known air flap apparatus is a cylindrical disk on each of whose opposite end faces is embodied a respective control groove into which a control pin scanningly engages. The control grooves on the two end faces of the groove carrier proceed in a circumferential direction at a varying distance from the rotation axis of the groove carrier, with the result that a radial displacement of the control pin occurs upon rotation of the groove carrier. The control pins are provided exclusively radially movably on the gated control configuration. The radial displacement of the control pins which is thereby brought about is transferred via coupling mechanisms, for example a Bowden cable, to the two sub-groups of air flaps. The motion of each control pin thus provides for the displacement of one sub-group of air flaps between its operating positions (open position and closed position). The known gated control configuration enables the following operating states of the air flap apparatus: both sub-groups are in the open position, both sub-groups are in the closed position, the first sub-group is in the open position and the second sub-group is in the closed position.

The two sub-groups are located as a rule at different sites on the motor vehicle, and they control air flows in different regions of, for example, the engine compartment of the motor vehicle. The known air flap apparatus permits opening of only one sub-group while the other is in its closed position, but for that operating state of the air flap apparatus the sub-group that is open is not selectable but is defined based on the conformation of the gated control configuration. It can also, however, be desirable to selectably open one of the two sub-groups and close the respective other one.

SUMMARY OF THE INVENTION

Proceeding from this known air flap apparatus, an object of the present invention is to refine that apparatus in such a way that the functionality achievable therewith is expanded.

This object is achieved according to the present invention by an air flap apparatus of the kind recited previously which is refined in that the at least two control grooves are embodied on an enveloping surface of the groove carrier at an axial distance from one another with reference to the rotation axis, and are coded in such a way that for two sub-groups, they permit at least four different combinations of operating positions.

An "enveloping surface" extends in this context not only in a circumferential direction around the rotation axis but at least also, preferably only, in an axial direction along the rotation axis.

With the known arrangement of control grooves on the end face of a cylindrical control disk, the control pins interacting with the control grooves must, as a result of the design, be moved radially in order to displace the sub-group associated with a respective control pin between its operating positions. The rotation path of the cylindrical control disk necessary for displacement of a sub-group is therefore dependent, in the context of the known gated configuration, on the position of the control pin. If the latter is located radially farther inward with reference to the rotation axis, the control disk must be rotated through a greater angle in order to displace the associated sub-group into the respective other operating position than when the control pin is located radially farther outward. It must be considered that a control groove cannot have an arbitrarily large inclination in the region of a transition between two operating positions, in order to avoid self-locking of the control pin sliding as intended along groove flanks.

With the arrangement proposed here of the control grooves on the enveloping surface of the groove carrier, the control pins are displaceable by the control grooves axially along the rotation axis. With the preferred cylindrical enveloping surface of the groove carrier, the control pin is preferably displaceable exclusively axially. With the selected arrangement of the control grooves on an enveloping surface of the groove carrier, unlike in the existing art described above, the rotation path of the rotatable groove carrier for bringing about a displacement of a sub-group between its two operating positions is independent of the particular operating position that has been reached. For a given diameter of the groove carrier, more space therefore exists on its enveloping surface than on its end surfaces for the placement of control grooves with which one or several displacements of the at least two sub-groups between their operating positions can be brought about.

With the approach according to the present invention presented above not only can at least two sub-groups each be both in the open position and in the closed position, but furthermore, of the at least two sub-groups each can be in the open position while the respective other one is in the closed position. Specifically for the operating state of the air flap apparatus in which only one of two sub-groups is in the open position, the sub-group for displacement into the open position can now be selected. Individual accessories that are located in the motor vehicle behind the air passthrough opening in a flow direction can therefore be convectively cooled, and others not.

The groove carrier is preferably a cylindrical drum; at least the enveloping surface of the groove carrier should be a cylindrical enveloping surface, so that no radial motion at all of the associated control pins is necessary upon rotation of the groove carrier. Also preferably, the groove carrier is a hollow cylindrical drum, so that a groove carrier having the least possible weight can be furnished.

The groove carrier can be thin, for example can be embodied as a tubular sheet-metal component or injection-molded component, so that the control grooves can pass radially through the groove carrier. In such a case, however, it is not possible for a control groove to continuously encircle the rotation axis. Alternatively, at least one control groove can also be embodied with a groove bottom, so that the groove bottom can connected the two groove flanks, arranged axially at a distance from one another, of a control groove. Because the groove bottom as a rule carries no control information, however, it is not necessary for a functioning air flap apparatus of the present invention.

With the preferred exclusively axial displacement of the control pins in interaction with the control groove into which they engage, the control information of the control groove is contained in the groove flanks.

For simple but functional control of the air flap apparatus, provision can be made that each control groove comprises at least one state configuration associated with one operating position and at least one transition configuration embodied divergently from the state configuration.

At least one control groove can comprise state configurations offset axially from one another with reference to the rotation axis, and at least one transition configuration connecting axially offset state configurations.

At least one control groove can likewise comprise two transition configurations that are counter-directional in a circumferential direction, and at least one state configuration connecting the transition configurations.

The "state configuration" is a portion of the control groove whose control pin, engaging into it, maintains an existing operational state of the sub-group associated with the control pin and control groove during a rotation of the groove carrier around its rotation axis, i.e. does not bring about any change in the operating position of the at least one air flap of the sub-group. A state configuration is therefore embodied in such a way that a control pin engaging into it is not displaced, or is not displaced sufficiently for a change in an operating position, during a rotation of the groove carrier. In the context of the cylindrical enveloping surface that is preferred above as a groove carrier, a state configuration of the control groove proceeds exclusively in a circumferential direction with no change in the axial location of the control groove. The state configuration is usually located in a neutral plane orthogonal to the rotation axis.

A "transition configuration," conversely, is a portion of the control groove whose control pin, engaging into it, brings about a change in the operating state of the sub-group associated with the control pin and control groove during a rotation of the groove carrier around its rotation axis, i.e. displaces the at least one air flap of the sub-group from one operating position into the respective other one. In the context of the cylindrical enveloping surface that is preferred above as a groove carrier, a transition configuration of the control groove preferably proceeds helically, i.e. its axial location also changes in a circumferential direction.

A maximally frequent change in an operating state of a sub-group upon rotation of the groove carrier, and thus a particularly large number of different operating state combinations, can be obtained by the fact that in a circumferential portion of the groove carrier in which one control groove comprises a state configuration, another control groove comprises a transition configuration.

If the control pins associated with the individual control grooves are arranged in a circumferential direction with an offset from one another in an offset direction by an amount equal to an offset angle, then in order to assess the arrangement of configurations of different control grooves in identical circumferential portions, the control grooves are to be considered to be offset back with respect to one another by an amount equal to the offset angle but in an opposite offset direction, i.e. as if the control pins were arranged along a common enveloping line of the enveloping surface of the groove carrier. The enveloping line spans a plane with the rotation axis.

What can be brought about by way of a combination of a state configuration of one control groove with a transition configuration of another control groove in the same circumferential portion of the groove carrier is, for example, that upon rotation of the groove carrier, the sub-group coupled to the state configuration maintains its operating state while the sub-group coupled to the transition configuration changes its operating state.

As a rule, an operating position of the air flaps collectively displaceable within a sub-group is reached when the control pin, interacting with a control groove, of the sub-group reaches the end of a transition configuration in a circumferential direction. A particularly large number of combinations of different operating states of different sub-groups in a circumferential direction can therefore be implemented if the ends of transition configurations of two different control grooves are located at the same circumferential position. This is because the control pins interacting with different transition configurations of different control grooves then reach the end of the respective transition configuration simultaneously upon rotation of the groove carrier, so that the sub-groups coupled therewith are displaced simultaneously into their respective operating state.

In a simple but preferred embodiment of the present invention, exactly two control grooves at an axial distance from one another are provided, the one having two transition configurations, arranged at a distance in a circumferential direction and counter-directional in the context of a predefined rotation direction, having a state configuration embodied between them; and the other comprising two state configurations arranged at a distance in a circumferential direction, having a transition configuration embodied between them.

The air flap apparatus whose air flap sub-groups are controlled in terms of their operating position by the above-described groove carrier is not limited in principle to the number of two. It can comprise more than two sub-groups each having at least one air flap, which are displaceable separately from one another. Because the control grooves embodied on the enveloping surface of the groove carrier are provided at an axial distance from one another, the groove carrier can be embodied axially with a sufficient length to accommodate the required number of control grooves. For an air flap apparatus having more than two air flap subgroups, the groove carrier therefore comprises more than two control grooves arranged at an axial distance from one another.

When each sub-group has, as preferred, only two operating states, i.e. all its air flaps are in either the one or the other operating position, each control groove associated with such a sub-group needs to be able to assume only two different axial positions: one for the open position and one for the closed position. For a number n of sub-groups, theoretically $2^n$ combinations of different operating states of all sub-groups can be achieved by way of the groove carrier presented here, as long as that number $2^n$ does not become so large that the transition configurations that bring about a transition between two operating positions do not, as a result of their increasing inclination relative to the aforementioned neutral plane, cause mechanical self-locking of the rotating groove carrier having one or several control pins. In such a case, corresponding space for decreasing the inclination of the transition configuration and thus effecting the individual operating states or operating positions can be created by increasing the radius of the groove carrier, as long as sufficient physical space is available.

The control pins can be coupled in relatively movable fashion to their respective sub-group, for example around a pivot axis parallel to the pin axis, so that at least for two sub-groups each of which comprises a plurality of air flaps that are connected by a coupling bar for a collective displacement motion between their operating positions, the respective motion trajectories of the coupling bars are neither parallel nor collinear. This gives the designer leeway for accommodating the air flaps with their sub-groups in the motor vehicle.

The air flaps of the air flap apparatus are preferably pivotably movable between their open position and their closed position, particularly preferably exclusively pivotably movable.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein:

FIG. 2 is a schematic perspective view of an exemplifying embodiment of a groove carrier of the gated control configuration of the air flap apparatus of FIG. 1; and FIG. 3 is a developed view of the cylindrical groove carrier of FIG. 2.

DESCRIPTION OF PREFERRED EMBODIMENTS

Figure 1:
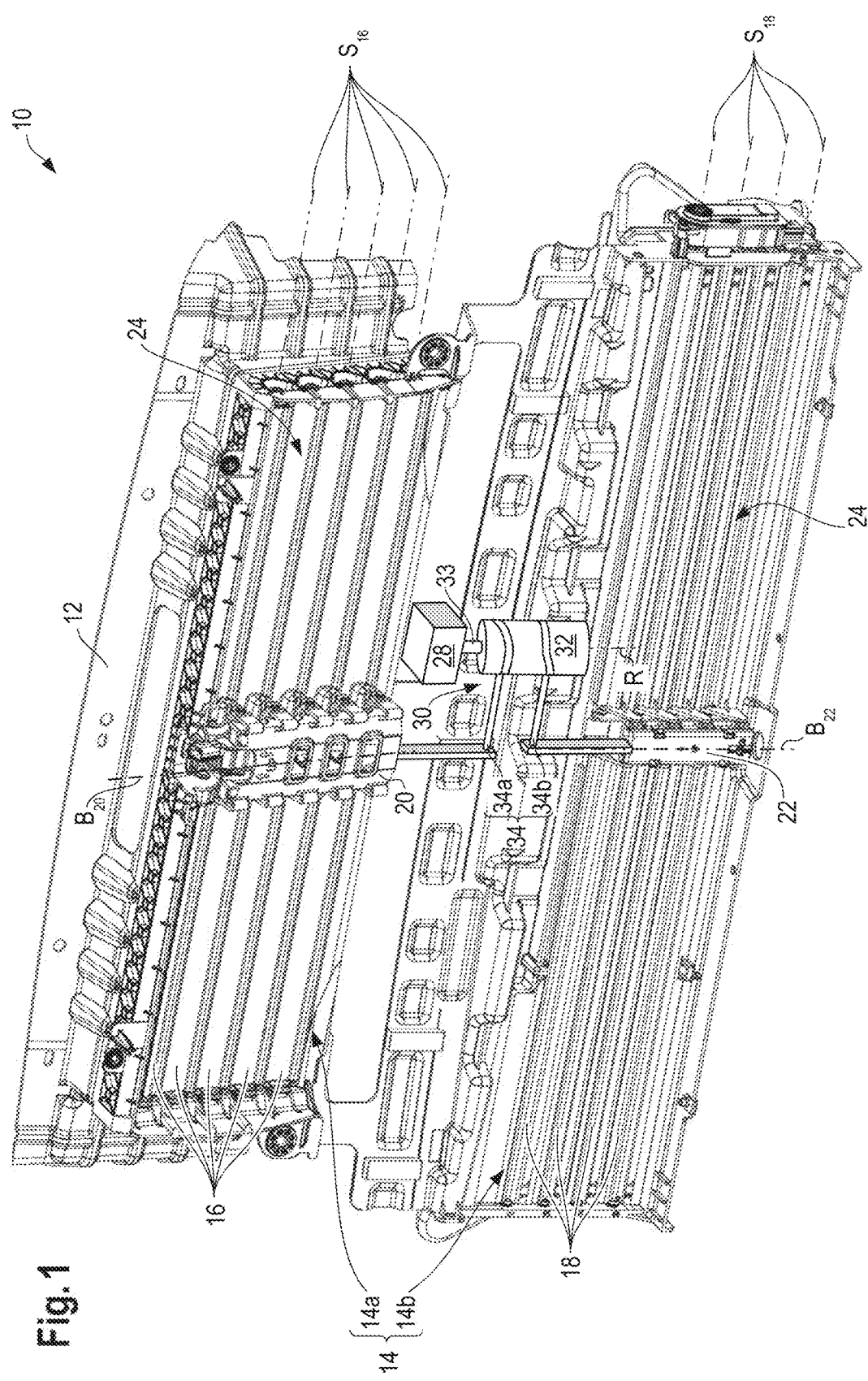
FIG. 1 is a schematic perspective rear view of an embodiment of an air flap apparatus of the present invention having two sub-groups of air flaps each collectively movable within the sub-group.

Referring now to the drawing wherein the showings are for the purpose of illustrating preferred and alternative embodiments of the invention only and not for the purpose of limiting the same, FIG. 1 shows an embodiment according to the present invention of an air flap apparatus of the present Application that is designated in general as 10. Air flap apparatus 10 encompasses, in a manner known per se, a (for example, injection-molded) air flap frame 12 in which an (in the example depicted) two-part air passthrough opening 14, having an upper partial opening 14a and a lower partial opening 14b, is embodied.

Upper partial opening 14a is divided at its transverse center by a vertical frame strip (not visible in FIG. 1). The left part of upper partial opening 14a is spanned by five mutually parallel air flaps 16 that are in their closed position in FIG. 1. The right part of upper partial opening 14a is likewise spanned by five air flaps 16 that are in their closed position.

Lower partial opening 14b is also divided at its transverse center by a vertical frame strip (not visible in FIG. 1), the right and left parts of lower partial opening 14b being respectively spanned by four mutually parallel air flaps 18 that are likewise in their closed position as depicted in FIG. 1.

Air flaps 16 are collectively pivotable, around mutually parallel pivot axes $S_{16}$, between the closed position shown in FIG. 1 and an open position that opens up upper partial opening 14a for air to flow through. In the example depicted, all pivot axes $S_{16}$ are located in one common plane.

Air flaps 18 are also collectively pivotable, around mutually parallel pivot axes $S_{18}$, between the closed position shown in FIG. 1 and an open position that opens up lower partial opening 14b for air to flow through. In the example depicted, pivot axes $S_{18}$ are also located in one common plane. In the example depicted, the respective planes of pivot axes $S_{16}$ and $S_{18}$ are not coplanar but instead enclose an angle around an inclination axis parallel to pivot axes $S_{16}$ and $S_{18}$. This is defined by the conformation of the motor vehicle at whose front end air flap apparatus 10 is to be arranged.

In the closed position shown in FIG. 1, the associated partial opening of air passthrough opening 14 is substantially closed, so that air flowing from outside, for example due to wind blast upon forward travel, onto the respective air flaps 16 and 18 is prevented from flowing through air passthrough opening 14. In the open position, conversely, a flow through the respective partial opening is possible.

Air flaps 16 of upper partial opening 14a are coupled by way of a coupling bar 20 for collective displacement between their operating positions (open position and closed position). Air flaps 18 of lower partial opening 14b are also coupled by a coupling bar 22 for collective displacement between their operating positions. Air flaps 16 therefore constitute a collectively movable upper air flap sub-group 24. Air flaps 18 constitute a collectively movable lower air flap sub-group 26.

Coupling bars 20 and 22 are displaceable along respective translational trajectories $B_{20}$ and $B_{22}$; in the example depicted, trajectory $B_{20}$ of upper coupling bar 20 and trajectory $B_{22}$ of lower coupling bar 22 enclose between them the same angle as the common planes of pivot axes $S_{16}$ and $S_{18}$.

Air flap apparatuses are, to this extent, known.

The air flap apparatus furthermore comprises a driving force source 28 in the preferred form of a DC electric motor, by which the two sub-groups 24 and 26 can be driven to perform a displacement motion between their operating states associated with the individual operating positions of the respective air flaps 16 and 18.

In order to allow sub-groups 24 and 26 to be driven separately from one another using a single driving force source 28 for displacement motion, driving force source 28 is coupled to a coupling control configuration 30. This comprises a cylindrical shifting drum 32. The cylindrical shifting drum 32 is connected, coaxially with output shaft 33 of driving force source 28, to the latter. It can therefore be rotated around rotation axis R by driving force source 28.

Coupling control configuration 30 encompasses, in addition to shifting drum 32, an arrangement 34 of control pins 34a and 34b.

FIG. 2 shows coupling control configuration 30 in isolation. Shifting drum 32 comprises two control grooves 36 and 38, embodied at an axial distance from one another along rotation axis R, that pass radially (in a thickness direction) completely through hollow-cylindrically embodied shifting drum 32. Control grooves 36 and 38 are therefore not completely circumferentially continuous.

Upper control pin 34a, which is motion-transferringly coupled to upper sub-group 24 via upper coupling bar 20, engages into upper control groove 36.

Lower control pin 34b, which is motion-transferringly coupled to lower sub-group 26 via lower coupling bar 22, correspondingly engages into lower control groove 38.

Control pins 34a and 34b, which are immovable radially and in a circumferential direction and are arranged at an axial distance from one another along a common enveloping line parallel to the rotation axis, can be axially displaced mutually independently by a rotation of shifting drum 32 around its rotation axis R. The shapes of control grooves 36 and 38 are most apparent from developed view 32' of shifting drum 32 in FIG. 3. Components and component portions identical to those in FIG. 2 are labeled in FIG. 3 with the same reference characters but with an apostrophe. Developed view 32' is a view of shifting drum 32 radially outward from rotation axis R.

Looking from left to right, upper control groove 36' begins in a low position from which a transition configuration 36u1' conveys control groove 36' into a high position. At the left end (in a circumferential direction) of transition configuration 36u1', air flaps 16 of upper sub-group 24 which are coupled to control pin 34a are in the closed position. At the right end (in a circumferential direction) of transition configuration 36u1', air flaps are displaced by gated control configuration 30 into the open position.

Transition configuration 36u1' is adjoined in a circumferential direction by a state configuration 36z' that proceeds orthogonally to rotation axis R. As long as control pin 34a is in engagement with state configuration 36z', the operating position of air flaps 16 of sub-group 24 does not change during a rotation of shifting drum 32.

State configuration 36z' is adjoined in a circumferential direction by a further transition configuration 36u2' that conveys control groove 36 from the high position into the low position. As a result of the engagement of control pin 34a with transition configuration 36u2' (see also FIG. 2), air flaps 16 of upper sub-group 24 are displaced from the open position back into the closed position as the rotation of shifting drum 32 proceeds in the same direction.

Upper control groove 36' can therefore, in a circumferential direction, displace air flaps 16 from the closed position into the open position and back again into the closed position, and the open position can be maintained as the only operating position over a rotation of shifting drum 32. All the configuration portions 36u1', 36z', and 36u2' preferably extend over circumferential portions of equal size.

Lower control groove 38 comprises at its outermost left end in FIG. 3 a state configuration 38z1' that holds control pin 34b, engaging into it, in a low position that is associated with the closed position, shown in FIG. 1, of air flaps 18 of lower sub-group 26.

Following state configuration 38z1' in a circumferential direction is a transition configuration 38u' that displaces control pin 34b from a low position into a high position and thus displaces air flaps 18 into the open position. Transition configuration 38u' is adjoined in a circumferential direction by a second state configuration 38z2' that holds control pin 34b, engaging into it, in a high position and thus holds the associated air flaps 38 in the open position.

Configuration segments 38z1', 38u', and 38z2' of lower control groove 38' extend over circumferential portions of equal size which correspond in terms of size and location to the circumferential portions of configuration portions 36u1', 36z', and 36u2' of upper control groove 36'. The longitudinal ends of each configuration segment of upper control groove 36' and of lower control groove 38' are thus located at the same circumferential coordinate around rotation axis R. Because control pins 34a and 34b are also located at the same circumferential coordinate it is thus possible, using the two control grooves 36 and 38 each having three configuration portions, to implement a total of four combinations of operating positions of upper sub-group 24 and lower sub-group 26.

When control pins 34a and 34b are located at the far left end (in FIG. 3) of control grooves 36' and 38', both sub-groups are in the closed position. When shifting drum 32 is rotated one configuration portion onward from there, so that upper control pin 34a is located at the transition between transition configuration 36u1' and state configuration 36z' and lower control pin 34b is simultaneously located at the transition between state configuration 38z1' and transition configuration 38', upper sub-group 24 is in the open position while lower sub-group 26 is still in the closed position.

When control drum 32 is rotated from there one further configuration portion onward, i.e. respectively to the transition from state configuration 36z' into transition configuration 36u2' and to the transition from transition configuration 38u' into state configuration 38z2', upper sub-group 24 remains in the open position while lower sub-group 26 is also displaced into the open position.

When control drum 32 is then rotated through the last configuration portion to the outermost right end (in FIG. 3) of control grooves 36' and 38', lower sub-group 26 remains in the open position while upper sub-group 24 becomes displaced into the closed position. The following operating position combinations thus exist, from right to left and from top to bottom: closed/closed, open/closed, open/open, and closed/open.

By way of an axially longer embodiment of control drum 32, further control grooves beyond the two control grooves 36 and 38 that are depicted can be embodied on enveloping surface 32a of control drum 32, and further sub-groups of collectively movable air flaps can be displaced between the open position and the closed position.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap apparatus for a motor vehicle, the air flap apparatus comprising at least one frame having an air passthrough opening embodied therein and a plurality of air flaps that are mounted movably on the at least one frame and at least project into the air passthrough opening or span it; the plurality of air flaps being movable between two operating positions, an open position and a closed position; the plurality of air flaps covering a smaller proportion of the air passthrough opening in the open position than in the closed position, when the air passthrough opening is viewed in a direction orthogonal to it; the air flap apparatus comprising a driving force source by way of whose driving force the plurality of air flaps are drivable to move between their operating positions;

the air flap apparatus further comprising at least two sub-groups of at least one air flap each, which are displaceable separately from one another between their operating positions but are drivable by the shared driving force source;

there being arranged between the driving force source and the at least two sub-groups a gated control configuration which in order to transfer driving force to different sub-groups comprises, on a groove carrier drum rotatable around a rotation axis, at least two control grooves, embodied separately and arranged at a distance from one another, into each of which a control pin penetrates, each combination of control pin and control groove being motion-transferringly coupled to a different one of the at least two sub-groups, wherein the at least two control grooves are embodied on a circumferential enveloping surface of the groove carrier drum at an axial distance from one another with reference to the rotation axis, and are coded in such a way that for two sub-groups, they permit at least four different combinations of operating positions.

2. The air flap apparatus according to claim 1, wherein each of the at least two control grooves comprises at least one state configuration associated with one operating position and at least one transition configuration embodied divergently from the state configuration.

3. The air flap apparatus according to claim 2, wherein in a circumferential portion in which one of the at least two control grooves comprises one of the at least one state configuration, another of the at least two control grooves comprises one of the at least one transition configuration.

4. The air flap apparatus according to claim 3, wherein in each circumferential portion in which the one of the at least two control grooves comprises one of the at least one state configuration, another control groove comprises one of the at least one transition configuration.

5. The air flap apparatus according to claim 2, wherein the ends of transition configurations of two different control grooves are located at the same circumferential position.

6. The air flap apparatus according to claim 2, wherein the at least two control grooves is exactly two control grooves, one of the two control grooves comprising two transition configurations, arranged at a distance in a circumferential direction and having a state configuration embodied between them; and the other of the two control grooves comprising two state configurations, arranged at a distance in a circumferential direction and having a transition configuration embodied between them.

7. The air flap apparatus according to claim 1, wherein the at least two sub-groups is more than two sub-groups each having at least one air flap, which are displaceable separately from one another, the groove carrier comprising more than two control grooves arranged at an axial distance from one another.

8. The air flap apparatus according to claim 1, wherein the at least two sub-groups each comprise a plurality of air flaps that are connected by a coupling bar for a collective displacement motion between their operating positions, motion trajectories of the coupling bars of the at least two sub-groups being neither parallel nor collinear.

9. A motor vehicle having an air flap apparatus according to claim 1.

* * * * *